United States Patent [19]

Kobayashi et al.

[11] 4,143,240

[45] Mar. 6, 1979

[54] CO-ORDINATE PLATE FOR CO-ORDINATE READER

[75] Inventors: Toshihiko Kobayashi, Mitaka; Tetsusaburo Kamibayashi, Niza, both of Japan

[73] Assignee: Kokusai Denshin Denwa Kabushiki Kaisha, Japan

[21] Appl. No.: 775,467

[22] Filed: Mar. 8, 1977

[30] Foreign Application Priority Data

Mar. 10, 1976 [JP] Japan .................................. 51-25869
Apr. 23, 1976 [JP] Japan .................................. 51-46226

[51] Int. Cl.² ........................................... G08C 21/00
[52] U.S. Cl. ........................................................ 178/19
[58] Field of Search ............. 178/18, 19, 20; 33/1 M, 33/1 P, 1 HH; 324/34 MA; 340/11; 333/30 M; 181/111, 112; 335/215

[56] References Cited

U.S. PATENT DOCUMENTS

| 3,806,642 | 4/1974 | Veith et al. | 178/19 |
| 3,904,821 | 9/1975 | Whetstone et al. | 178/19 |
| 3,956,588 | 5/1976 | Whetstone et al. | 178/19 |
| 4,018,989 | 4/1977 | Snyder et al. | 178/19 |

*Primary Examiner*—Thomas A. Robinson
*Attorney, Agent, or Firm*—Robert E. Burns; Emmanuel J. Lobato; Bruce L. Adams

[57] ABSTRACT

A co-ordinate plate for a co-ordinate reader, which utilizes delays of oscillation waves in a magnetostrictive material. The co-ordinate plate is composed of a thin plate of magnetostrictive material having a co-ordinate plane and similar propagation characteristics of magnetostrictive oscillation waves in directions of at least two co-ordinate axes of the co-ordinate plane, two exciting coils for producing magnetostrictive oscillation in the thin plate of magnetostrictive material in one and the other of co-ordinate directions of the co-ordinate plane, and flux keepers for shielding magnetic fluxes emanating from the exciting coils.

15 Claims, 9 Drawing Figures

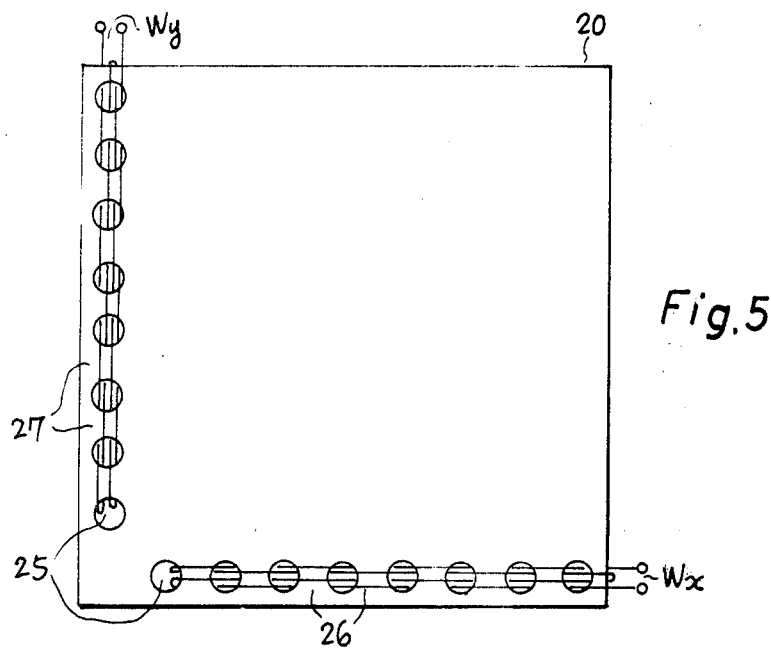
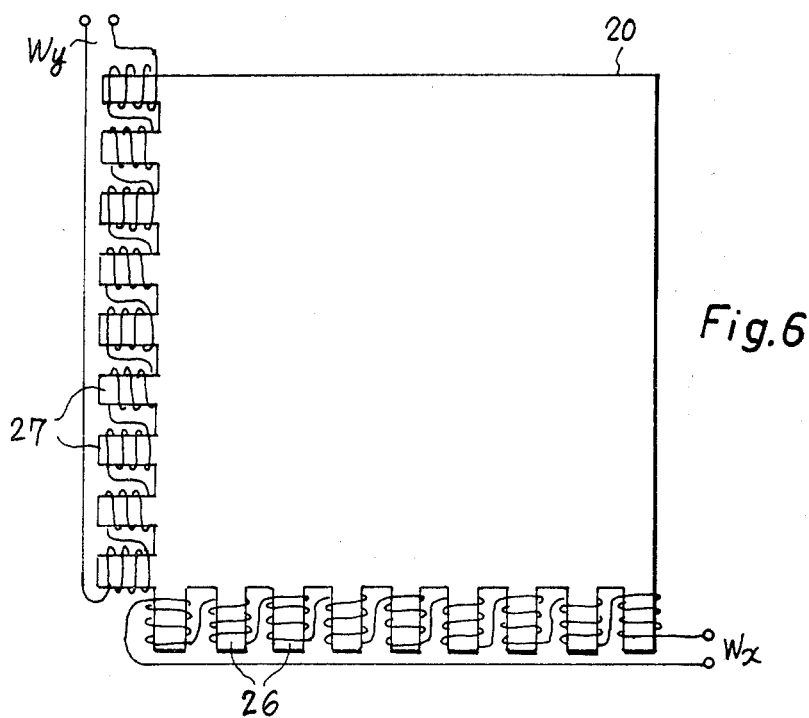

CO-ORDINATE PLATE FOR CO-ORDINATE READER

FIELD OF THE INVENTION

This invention relates to a co-ordinate reader which utilizes delays of oscillation waves in a magnetostrictive material.

DESCRIPTION OF THE PRIOR ART

A conventional co-ordinate reader of the type employing magnetostrictive delay lines is simple in construction and easy to handle, so that it is widely used as an input device, an auto-drafter or the like in electronic computers. On a conventional co-ordinate plate, there are disposed in a matrix form parallel magnetostriction delay line groups in the Y and X directions, with a thin insulating sheet interposed therebetween, and the magnetostrictive delay lines are each fixed at both ends to the co-ordinate plate by means of an adhesive so as to eliminate reflection noise. Further, exciting lines $W_x$ and $W_y$ are each disposed to perpendicularly intersect the delay lines in the vicinity of one end of each of them. Upon application of a pulse current to the exciting line $W_x$, in a case where a detecting coil is placed on the co-ordinate plate at a desired point, those portions of all the Y-direction delay lines which are in contact with the exciting line $W_x$ cause magnetostrictive oscillation. This oscillation propagates in each delay line toward the other end thereof, and when the oscillation has reached the position directly below the detecting coil, a magnetic flux variation caused by the oscillation induces a voltage in the detecting coil. Accordingly, the Y co-ordinates at that point are digitized by measuring the time interval between the application time of the exciting pulse and the detection time of the output, that is, the delay time, by counting of clock pulses. Then, the X co-ordinates of the point are obtained by exciting the exciting line $W_y$ in exactly the same manner as described above. In this case, the accuracy of the co-ordinate reading is dependent upon the propagation speed of the magnetostrictive oscillation, but since the magnetostrictive oscillation is appreciably low in propagation speed, as compared with an electronic speed, a resolving power of 0.25 mm is obtained in a case where the delay lines are formed of a 50% iron-cobalt alloy. However, in the case of such a conventional device as described above, a magnetostrictive material is drawn and rolled to obtain ribbon-like delay lines, which are then disposed on a substrate one by one to form a co-ordinate plate. This leads to defects that the productivity is low and that the characteristics of the delay lines cannot easily be adjusted at the accuracy higher than a certain accuracy due to variations in the characteristics resulting from dispersion in the tensile forces of the individual delay lines.

SUMMARY OF THE INVENTION

An object of this invention is to provide a co-ordinate plate for co-ordinate readers, which has a feature of a very simple construction employing one thin plate of a magnetostrictive material in place of the abovementioned delay line groups and exciting coils of two directions wound directly on the thin plate, and which is highly accurate, small and inexpensive.

In accordance with this invention, there is provided a co-ordinate plate for co-ordinate readers, comprising a thin plate of magnetostrictive material having a co-ordinate plane and similar propagation characteristics of magnetostrictive oscillation waves in directions of at least two co-ordinate axes of the co-ordinate plane, two exciting coils for producing magnetostrictive oscillation in the thin plate of magnetostrictive material in one and the other of the co-ordinate axial directions of the co-ordinate plane, and flux keepers for shielding magnetic fluxes emanating from the exciting coils.

BRIEF DESCRIPTION OF THE DRAWINGS

The principle, construction and operation of this invention will be clearly understood from the following detailed description taken in conjunction with the accompanying drawings, in which:

FIGS. 4, 5 and 6 are plan views each illustrating an embodiment of this invention.

DESCRIPTION OF THE PREFERRED EMBODIMENTS

Figure 1:
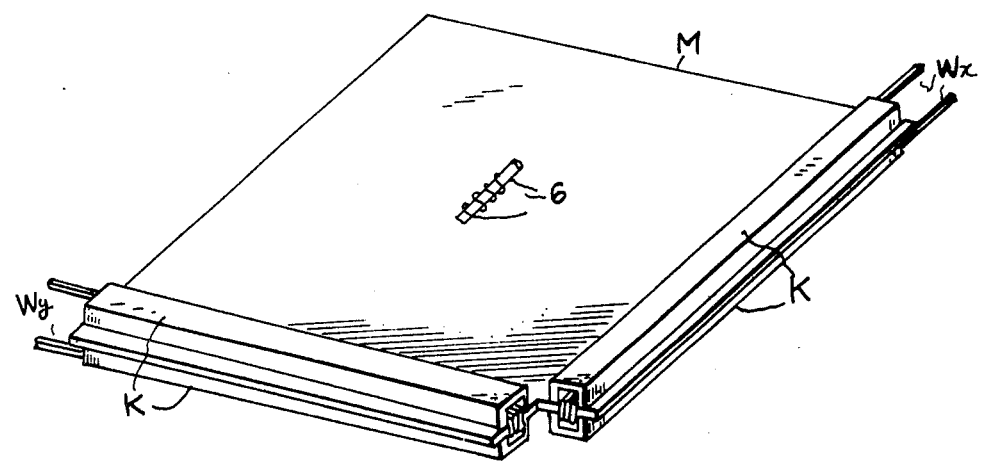
FIGS. 1 and 2 are perspective views each illustrating an embodiment of this invention.

In FIG. 1 illustrating an embodiment of the co-ordinate plate of this invention, one corner of a square or rectangular thin plate M as of a nickel- or iron-cobalt alloy is cut out and X- and Y-direction exciting coils $W_x$ and $W_y$ are wound on the thin plate along its marginal portions, as shown, and the so-called flux keepers K are respectively disposed close to the exciting coils $W_x$ and $W_y$ to cover them so that magnetic fluxes emanating from the exciting coils $W_x$ and $W_y$ are thereby shielded to reduce direct induction to a detecting coil 6 and to enhance the efficiency of the exciting currents. With the exciting coils $W_x$ and $W_y$ wound directly on the thin plate M and the flux keepers K respectively disposed in close contact with them, as described above, perfectly closed magnetic paths are formed around the exciting coils $W_x$ and $W_y$, thereby to provide for remarkedly enhanced excitation efficiency.

The flux keepers K are made of ferrite and formed to be elongated and U-shaped in section, but may also be bandshaped ferrite rubbers a little wider than the exciting coils $W_x$ and $W_y$ and, in the latter case, the ferrite rubbers are pressed against the exciting coils $W_x$ and $W_y$ from above. It is the best to closely cover the exciting coils $W_x$ and $W_y$ from both sides thereof, as shown, but in a case where the thin plate M is more than 50 $\mu$m in thickness, the same results as above described cannot be obtained even by covering the exciting coils $W_x$, $W_y$ with the flux keepers K only on the side of the thin plate on which the detecting coil 6 is placed.

Figure 2:
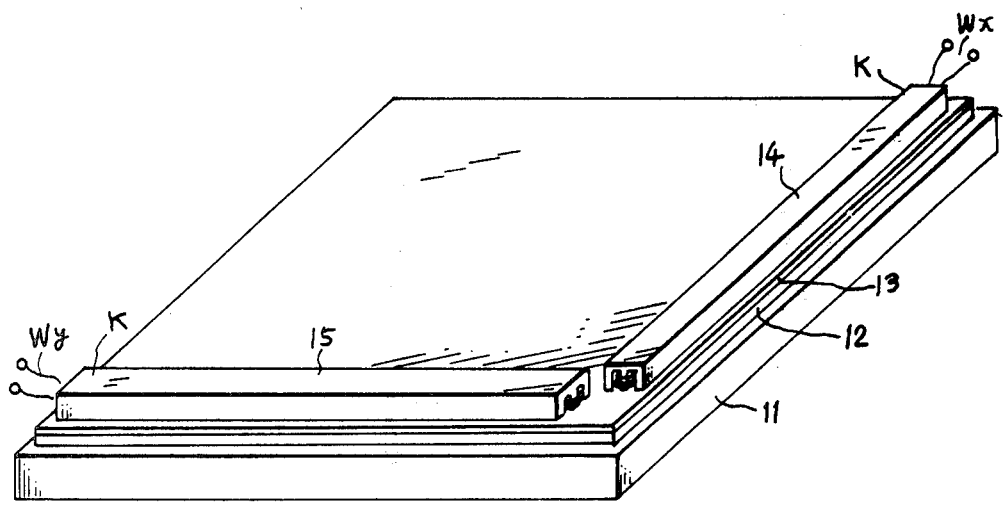

FIG. 2 illustrates a modified form of this invention, in which the surface of a square conductor plate 12 on an insulating material substrate 11 such as a printed circuit board is electroplated by a magnetostrictive material 13 and flux keepers K, which are respectively formed with ferrite cores 14 and 15 of E-shaped section and having respectively wound thereon the exciting coils $W_y$ and $W_x$, are disposed on the electroplated conductor plate 12 along its marginal portions, as illustrated. In this case, it is possible, of course, to wind exciting lines directly on the insulating material substrate and cover them with the flux keepers K of U-shaped section, as is the case with the example of FIG. 1.

The thin plate of magnetostrictive material may be a rolled one, or a magnetostrictive material film obtained by electroplating a magnetostrictive material on a smooth substrate as of stainless steel. Further, it is also possible to employ a thin plate of conductive metal such as, for example, copper or iron, which is electroplated by a magnetostrictive material. In this case, if the thin plate is formed of a resilient conductor, for instance, phosphor bronze, beryllium bronze or the like, the magnetostrictive oscillation attenuation characteristic can be remarkedly improved, and even if the magnetostrictive material is made thin for an operation at a high frequency, the exciting coils are easy to wind.

In order that the X- and Y-direction outputs may be substantially equal to each other, the magnetic anisotropy of such a magnetostrictive material is desired to diagonally lie along the surface of the plate, that is, in a direction of 45° passing through the origin of the rectangular co-ordinates and bisecting the co-ordinate plane, or in a direction perpendicularly intersecting the abovesaid direction, or in the direction of the film thickness. However, a magnetostrictive material of magnetic isotropy can also be employed if it is previously magnetized strongly in one of the two diagonal directions. Further, it is also possible to use a magnetostrictive material having the magnetic anisotropy in the direction of its thickness.

Moreover, the co-ordinate plate may also be formed by plating the surface of a square conductor on a printed circuit board with a magnetostrictive material and pressing X- and Y-direction exciting coils with flux keepers against the marginal portions of the plated conductor. In this case, it is preferred that the flux keepers are formed of ferrite rubber to have an E-letter section or a band-shaped configuration.

Figure 3A:
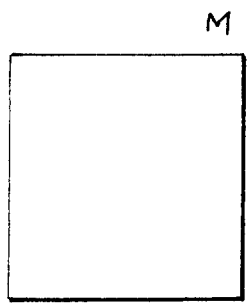
FIGS. 3A, 3B and 3C are plan views each illustrating an example of magnetostrictive material thin plate structure for use in this invention.
Figure 3B:
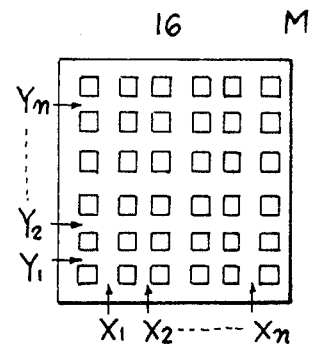
Figure 3C:
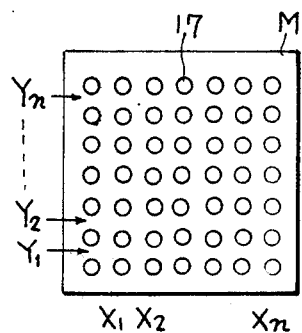

The above has described the case where the thin plate of magnetostrictive material M has a uniform, flat surface, as shown in FIG. 3A. However, in short, since it is sufficient for the thin plate only that the magnetostrictive oscillating wave propagation characteristics in the directions of at least two co-ordinate axes of the co-ordinate plane are approximate to each other, other configurations can also be employed. For example, square or circular holes 16 or 17 may also be formed in a matrix form in the co-ordinate plane so that many first and second oscillating wave propagation paths $X_1, X_2 \ldots X_n$ and $Y_1, Y_2 \ldots Y_n$ are formed at predetermined intervals along the two co-ordinate axes of the co-ordinate plane, as shown in FIGS. 3B and 3C.

Further, the co-ordinate system is not limited specifically to the rectangular co-ordinate system, but may also be the oblique co-ordinate system.

Moreover, when the thickness of the magnetostrictive material is less than 20 μm, attenuation remarkedly increases in the propagation of magnetostrictive oscillation, and when more than 5 mm, a very large current is required for causing the magnetostrictive oscillation, so that neither of such thicknesses is preferred. Accordingly, the thickness of the magnetostrictive material is suitably selected to be intermediate between the above values in accordance with the purpose of use and the condition of an external detector.

Figure 4:
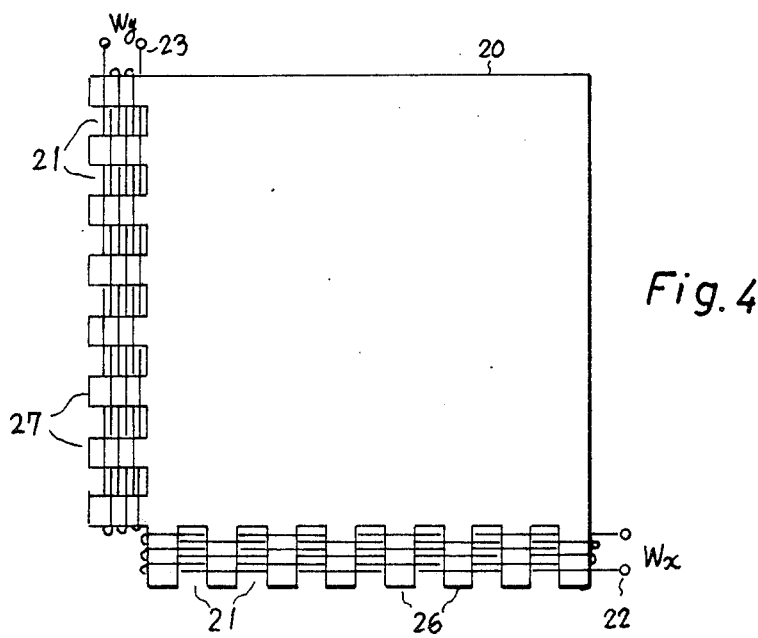

FIG. 4 shows another embodiment of this invention which employs a square or rectangular thin plate of magnetostrictive material 20 which is formed of, for instance, nickel or of iron-cobalt alloy and has similar magnetostrictive oscillating wave propagation characteristics along at least two rectangular co-ordinate axes of the co-ordinate plane formed on the magnetostrictive material thin plate. The marginal portions of two adjacent sides of the thin plate are cut out at predetermined intervals to form projections, as indicated by 21, and exciting lines 22 and 23 are respectively threaded through the projections to form woven exciting coils $W_x$ and $W_y$, as shown.

In a case where exciting coils have been wound directly on the thin plate without forming the cut-out portions 21, when a detecting coil such as coil 6 in FIG. 1 is approached to the exciting coil $W_x$ or $W_y$, a magnetic flux due to an exciting current is directly induced in the detecting coil, making it impossible to detect an induced voltage resulting from magnetostrictive oscillation. Accordingly, in such a case, there is a need of magnetically shielding the exciting coils $W_x$, $W_y$ or the detecting coil with a magnetic substance such, for example, as a ferrite core.

In the present invention, the directions of fluxes caused by currents flowing in the exciting coils $W_x$ and $W_y$ reverse every cut-out portion, so that the fluxes are cancelled out as a whole and there occurs substantially no direct flux induction owing to the exciting currents. Consequently, substantially the entire area of the co-ordinate plane formed on the co-ordinate plate can be used and, further, since the volume of the magnetostrictive material which causes oscillation is decreased by the cut-out portions described above, the exciting energy is correspondingly reduced.

The cut-out portions 21 for weaving the exciting coils $W_x$ and $W_y$ around the projections may be replaced by windows or holes 25, as shown in FIG. 5. This makes it a little difficult to weave the exciting coils, but is advantageous in case of forming the co-ordinate plate using a thin plate obtained by electroplating a magnetostrictive material on a conductor placed on a printed board.

In the present invention, the first and second exciting coils $W_x$ and $W_y$ are provided by which adjacent ones of first and second unit excitation parts 26 and 27, which are respectively separated by the aforesaid cut-out portions 21 or windows or holes 25 and arranged to extend in parallel with the two co-ordinate axes, are alternately excited in opposite polarities along the co-ordinate axes, respectively.

The exciting coils $W_x$ and $W_y$ may also be wound around each of the unit excitation parts 26 and 27 as shown in FIG. 6 so that adjacent ones of the unit excitation parts are alternately excited in opposite polarities, as described above.

Figure 7:
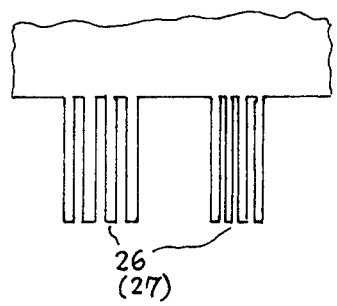
FIG. 7 is a fragmental plan view illustrating a modification of a part of the embodiment illustrated in FIGS. 4 and 6.

The excitation efficiency can be further enhanced by dividing each of the unit excitation parts 26 and 27 into a plurality of excitation segments, as illustrated in FIG. 7.

Our experimental results show that in a case where the exciting coils were not wound to cancel the fluxes caused by the exciting currents as in the present invention, a signal which was produced by magnetostrictive oscillation in an area within about 5 cm perpendicularly from the position of each exciting coil, was disturbed by noise which was directly induced to the detecting coil from the exciting coil, with the result that an erroneous operation occurs to make a co-ordinate indication inaccurate. However, it has been found that according to this invention, a normal operation is obtained at a distance of about 1 cm perpendicularly from the position of the exciting coil. The effect of the invention is very striking.

An iron-cobalt alloy has a magneto-strictive coefficient, which largely varies in accordance with the composition. In case of an iron-cobalt alloy plate produced by the electric plating method, the magneto-strictive coefficient becomes maximum at the vicinity of a composition of 20% iron-80% cobalt. As the above co-ordinate plate of this invention, the composition range of 10% iron-90% cobalt to 48% iron-52% cobalt is suitable. In this case, the output pulse of a conventional co-ordinate plate can be strengthened by several times to several ten times by the use of the above iron-cobalt alloy.

As has been described in the foregoing, the co-ordinate plate of this invention is very simple in construction and easy to manufacture and adjust, as compared with the conventional co-ordinate plate, and further, the exciting current is also reduced by the effect of the flux keepers and the use of a resilient conductor leads to appreciable improvements in the characteristic of the co-ordinate plate such as small attenuation of magneto-strictive oscillation. Moreover, reduction of the cost and miniaturization can also be expected. The co-ordinate plate of this invention exhibits its features especially when employed as an input device for picture processing or other purposes in combination with a mini-computer. Further, the co-ordinate plate of this invention is also suitable for popular use such as a device for obtaining the length of a curve or an area. Accordingly, this invention is very valuable from the industrial point of view.

What we claim is:

1. A co-ordinate plate for a co-ordinate reader, comprising: a thin plate of magnetostrictive material having a co-ordinate plane and similar magnetostrictive oscillating wave propagation characteristics in directions of at least two co-ordinate axes of the co-ordinate plane, two exciting coils for producing magnetostrictive oscillation in the thin plate of magnetostrictive material in one and the other of the two co-ordinate directions of the co-ordinate plane, and flux keepers for shielding magnetic fluxes emanating from the exciting coils, said thin plate of magnetostrictive material having holes arranged in a matrix form in the co-ordinate plane so that many first and second oscillating wave propagation paths are formed at predetermined intervals along the two co-ordinate axes, respectively.

2. A co-ordinate plate for a co-ordinate reader according to claim 1, wherein the thin plate of magnetostrictive material has a uniform, flat surface.

3. A co-ordinate plate for a co-ordinate reader according to claim 1, wherein the two co-ordinate axes are the ordinate and the abscissa of the rectangular co-ordinate system, respectively.

4. A co-ordinate plate for a co-ordinate reader according to claim 1, wherein the two co-ordinate axes are two co-ordinate axes of the oblique co-ordinate system, respectively.

5. A co-ordinate plate for a co-ordinate reader according to claim 1, wherein the thin plate of magnetostrictive material is deposited on the surface of a substrate.

6. A co-ordinate plate for a co-ordinate reader according to claim 1, wherein the thin plate of magnetostrictive material has magnetic isotropy.

7. A co-ordinate plate for a co-ordinate reader according to claim 1, wherein the thin plate of magnetostrictive material has magnetic anisotropy in the direction of its thickness.

8. A co-ordinate plate for a co-ordinate reader according to claim 1, wherein the thin plate of magnetostrictive material has magnetic anisotropy in a direction substantially bisecting an angle formed by the two co-ordinate axes.

9. A co-ordinate plate for a co-ordinate reader according to claim 1, wherein the flux keepers shield the exciting coils on both sides of the thin plate of magnetostrictive material.

10. A co-ordinate plate for a co-ordinate reader according to claim 1, wherein the flux keepers shield the exciting coils only on one side of the thin plate of magnetostrictive material.

11. A co-ordinate plate for a co-ordinate reader according to claim 10, wherein the flux keepers are respectively E-shaped in section and have wound thereon the exciting coils.

12. A co-ordinate plate for a co-ordinate reader comprising: a thin plate of magnetostrictive material having a co-ordinate plane and similar magnetostrictive oscillating wave propagation characteristics in directions of at least two co-ordinate axes of the co-ordinate plane, a plurality of first and second unit excitation parts on said plate arranged to extend in parallel with said two co-ordinate axes respectively, said first and second excitation parts being provided by forming many windows at regular intervals in the marginal portions of said thin plate respectively corresponding to said co-ordinate axes, first and second exciting coils adjacent said first and second unit excitation parts in opposite polarities along said co-ordinate axes respectively for producing magnetostrictive oscillation in the thin plate of magnetostrictive material in one and the other of the two co-ordinate directions of the co-ordinate plate, and flux keepers for shielding magnetic fluxes emanating from said exciting coils.

13. A co-ordinate plate for a co-ordinate reader according to claim 12, wherein the first and second exciting coils are respectively disposed to be threaded between the many unit excitation parts.

14. A co-ordinate plate for a co-ordinate reader according to claim 12, wherein the first and second exciting coils are respectively disposed to be wound around the many unit excitation parts.

15. A co-ordinate plate for a co-ordinate reader according to claim 12, wherein the unit excitation parts are each divided into a plurality of small excitation segments.

* * * * *